(12) United States Patent
Herold

(10) Patent No.: US 11,225,101 B1
(45) Date of Patent: Jan. 18, 2022

(54) CARD SYSTEMS

(71) Applicant: Timothy Herold, Phoenix, AZ (US)

(72) Inventor: Timothy Herold, Phoenix, AZ (US)

( * ) Notice: Subject to any disclaimer, the term of this patent is extended or adjusted under 35 U.S.C. 154(b) by 0 days.

(21) Appl. No.: 16/027,148

(22) Filed: Jul. 3, 2018

Related U.S. Application Data

(60) Provisional application No. 62/683,536, filed on Jun. 11, 2018, provisional application No. 62/529,314, filed on Jul. 6, 2017.

(51) Int. Cl.
| | | |
|---|---|---|
| *B42D 15/04* | (2006.01) | |
| *G09F 1/04* | (2006.01) | |
| *G06K 7/10* | (2006.01) | |
| *A23K 50/40* | (2016.01) | |
| *G06K 19/06* | (2006.01) | |
| *B42D 15/02* | (2006.01) | |

(52) U.S. Cl.
CPC ............ *B42D 15/045* (2013.01); *A23K 50/40* (2016.05); *B42D 15/022* (2013.01); *G06K 7/10366* (2013.01); *G06K 19/06037* (2013.01); *G09F 1/04* (2013.01)

(58) Field of Classification Search
None
See application file for complete search history.

(56) References Cited

U.S. PATENT DOCUMENTS

| | | | | |
|---|---|---|---|---|
| 4,203,516 A | * | 5/1980 | Stonoga | ................. B65D 85/00 206/216 |
| 5,062,229 A | * | 11/1991 | Werjefelt | ............... B42D 5/043 283/100 |
| 5,575,384 A | | 11/1996 | Saye | |
| 5,702,740 A | | 12/1997 | Wild | |
| 6,196,447 B1 | | 3/2001 | Purcell et al. | |
| 6,355,285 B1 | | 3/2002 | Hoy | |
| 7,004,398 B1 | | 2/2006 | Francis et al. | |
| 7,740,179 B2 | * | 6/2010 | Mattlin | .................. G06K 17/00 235/487 |
| 9,090,115 B2 | | 7/2015 | Shields | |
| 9,227,457 B1 | | 1/2016 | Grote | |

(Continued)

FOREIGN PATENT DOCUMENTS

| | | |
|---|---|---|
| CN | 200963951 Y | 10/2007 |
| DE | 4229897 A1 | 3/1994 |
| DK | 9300133 U3 | 5/1993 |
| FR | 2837356 A | 9/2003 |

(Continued)

OTHER PUBLICATIONS

Kate, DIY . . . Edible Greeting Cards!, Retrieved from the Internet http://www.katescreativespace.com/2016/05/30/diy-edible-greeting-cards/. May 30, 2016, 8 pages.

(Continued)

*Primary Examiner* — Gary C Hoge
(74) *Attorney, Agent, or Firm* — Adam R. Stephenson, Ltd.

(57) ABSTRACT

Implementations of card systems may include a card which may include a front flap hingedly coupled to a rear flap and either a printed coupon or a printed code for an electronic coupon on either the front flap or the rear flap. Implementations of card systems may also include a comestible coupled between the front flap and the rear flap. The comestible may be between 1-10 times the thickness of the card. The comestible may correspond with one of the printed coupon and the printed code for the electronic coupon.

5 Claims, 2 Drawing Sheets

(56) References Cited

U.S. PATENT DOCUMENTS

| | | | |
|---|---|---|---|
| 2007/0024449 A1* | 2/2007 | Bilyeu | G06K 17/00 340/573.1 |
| 2007/0113432 A1* | 5/2007 | Poole | G09F 1/00 40/124.06 |
| 2007/0227052 A1 | 10/2007 | Hartley | |
| 2008/0008786 A1 | 1/2008 | Sevilla et al. | |
| 2010/0127051 A1 | 5/2010 | Hess | |
| 2014/0150307 A1* | 6/2014 | Ehrlich | B42D 15/022 40/124.03 |
| 2015/0019518 A1* | 1/2015 | Buchanan | B42D 15/025 707/705 |
| 2015/0279240 A1* | 10/2015 | Fluharty | B42D 15/042 40/124.04 |
| 2016/0375359 A1* | 12/2016 | Mayer | A63F 13/2145 40/124.01 |
| 2017/0066277 A1 | 3/2017 | Cecchi et al. | |

FOREIGN PATENT DOCUMENTS

| | | |
|---|---|---|
| GB | 190604124 A | 11/1906 |
| GB | 2296681 A | 7/1996 |
| JP | 8119370 A2 | 5/1996 |
| WO | 1998010942 A1 | 3/1998 |
| WO | 199913707 A1 | 3/1999 |
| WO | 1999047431 A1 | 9/1999 |
| WO | 2000020287 A1 | 4/2000 |
| WO | 2003043434 A1 | 5/2003 |
| WO | 2010146218 A1 | 12/2010 |

OTHER PUBLICATIONS

Rucker, Laura, Edible chocolate-Flavored Greeting Card?, Retrieved from the Internet http://www.gotchocolate.com/2011/03/edible-chocolate-flavored-greeting-card/, Mar. 1, 2011, 12 pages.

* cited by examiner

CARD SYSTEMS

CROSS REFERENCE TO RELATED APPLICATIONS

This document claims the benefit of the filing dates of U.S. Provisional Patent Application 62/529,314, entitled "Pet of Human Food Product, Paper Thin Used for Gifts, Advertising, Branding etc." to Timothy Herold which was filed on Jul. 6, 2017 and U.S. Provisional Patent Application 62/683,536, entitled "Edible Comestible Cards" to Timothy Herold which was filed on Jun. 11, 2018, the disclosures of each of which are hereby incorporated entirely herein by reference.

BACKGROUND

1. Technical Field

Aspects of this document relate generally to cards, such as greeting cards. More specific implementations involve cards including a comestible.

2. Background

Conventionally, greeting cards have included a card having a message therein. Greeting cards are commonly sent and received on special occasions, such as birthdays, holidays, and other occasions. Greeting cards may also be used to offer condolences or congratulations.

SUMMARY

Implementations of card systems may include a card which may include a front flap hingedly coupled to a rear flap and either a printed coupon or a printed code for an electronic coupon on either the front flap or the rear flap. Implementations of card systems may also include a comestible coupled between the front flap and the rear flap. The comestible may be between 1-10 times the thickness of the card. The comestible may correspond with one of the printed coupon and the printed code for the electronic coupon.

Implementations of card systems may include one, all, or any of the following:

The printed code for the electronic coupon may be a quick response (QR) code.

The comestible may be configured to be consumed by a canine.

The comestible may be a sample of a product of either the printed coupon or the printed code for the electronic coupon.

The card may be printed with laser marking

A portion of print on the card may be printed with conductive ink.

The conductive ink may be configured to be tracked.

A portion of print on the card may be printed with fluorescent ink.

Implementations of card systems may include a card including a front flap hingedly coupled to a rear flap, an RFID reader, and a display coupled with the RFID reader. Implementations of card systems may also include a planar comestible coupled between the front flap and the rear flap. The planar comestible may include an RFID tag. The RFID reader may be configured to read the RFID tag of the planar comestible and change a display of the card using data from the RFID tag.

Implementations of card systems may include one, all, or any of the following:

The RFID tag may be printed on the comestible.

The RFID tag may be configured to be tracked.

The RFID reader may be configured to change the display of the card when the card is opened.

The card system may include an integrated circuit coupled to a speaker. The RFID tag may be configured to produce audio through the integrated circuit and the speaker when the card is opened.

Implementations of card systems may include a card which may include a front flap hingedly coupled to a rear flap and either a printed coupon or a printed code for an electronic coupon on either the front flap or the rear flap. Implementations of card systems may also include one or more openings configured to receive a planar comestible coupled between the front flap and the rear flap. The planar comestible may be configured to be held by/in the one or more openings of the card. The planar comestible may correspond with the printed coupon or the printed code for the electronic coupon.

Implementations of card systems may include one, all, or any of the following:

The comestible may include a design configured to interact with the card.

The card may be a pop-up card.

The comestible may contact a pop-up portion of the card.

The comestible may be configured to be consumed by a canine.

The comestible may be a sample of a product of either the printed coupon or the printed code for the electronic coupon.

The card may include four openings configured to receive four corners of a comestible.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended cards will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such cards, and implementing components and methods, consistent with the intended operation and methods.

Implementations of the card systems disclosed herein generally refer to comestibles being included with a card, however, it is understood that other products, including samples of particular products, may be included within the card in place of the comestible. Such products may include, by non-limiting example, flat packages of cosmetics, lotions, after shave, cologne, perfume, wet wipes, or any other product. In implementations including a comestible, the comestible may be intended for human consumption or animal consumption. In particular implementations, the comestible may be intended for consumption by a canine. In implementations where the comestible is intended for human consumption, the comestible may include, by non-limiting example, jerky, fruit leather, candy, chocolate, baby formula, or any other comestible. The edible comestible cards disclosed herein may include any type or component of the cards, or methods related to the cards, disclosed in U.S. Provisional Patent Application No. 62/529,314 and U.S. Provisional Patent Application 62,683,536, both of which were previously incorporated entirely herein by reference.

Figure 1:
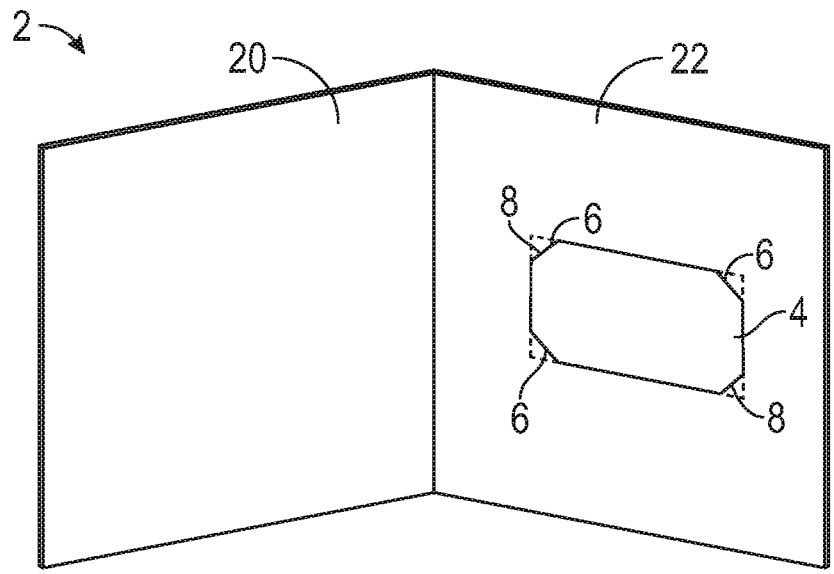
FIG. 1 is a front perspective view of an open card.

Referring to FIG. 1, a card system is illustrated. The card system includes a card 2, and as illustrated by FIG. 1, the card 2 is in an open position. The card 2 may have a front flap 20 which may be hingedly coupled to a rear flap 22. The card system may include a comestible 4. As used herein, comestible may refer to just an edible product or an edible product enclosed in a protective wrapper or packaging. In implementations having a front flap 20 and a rear flap 22, the comestible 4 may be coupled between the front flap 20 and the rear flap 22 when the card 2 is in a closed position. In various implementations, the comestible 4 may be planar and may be thin enough to fit within a closed card and shipped in a standard envelope without incurring additional shipping costs. In particular implementations, the comestible may be between 1-10 times the thickness of the card 2. In other implementations, it may be less than 1 time or more than 10 times the thickness of the card 2.

The comestible 4 may be of varying shapes and sizes. The comestible 4 may be as tall and/or wide as the height and/or width of the closed card, or may be less tall and/or less wide than the height and width of the closed card. In various implementations, the card 2 may be configured with structures 6 designed to hold or assist in holding the comestible 4 in place. The card 2 may include one or more openings configured to receive and hold the comestible 4. As illustrated by FIG. 1, the card 2 may include four slits 8 corresponding to four corners 10 of the comestible 4. In other implementations, the card 2 may include more or fewer than four slits. The corners 10 of the comestible 4 may be configured to be inserted into the slits 8 in various implementations. For comestibles that do not have four corners, the card may include slits or other openings designed to interact with one or more portions of the comestible to hold the comestible in place.

Figure 2:
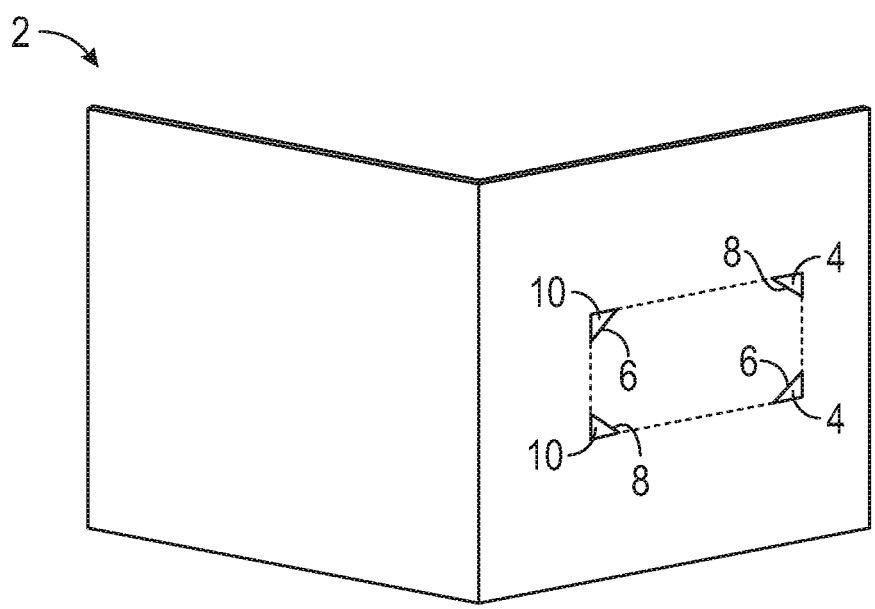
FIG. 2 is a rear perspective view of an open card.

Referring to FIG. 2, a rear view of the card system of FIG. 1 is illustrated. As illustrated by FIG. 2, the comestible 4 is held in place by the card 2 and within the card as the corners 10 of the comestible 4 extend through the slits 8. In other implementations, the card 2 may be configured to hold or support the comestible 4 in other manners, such as, by non-limiting example, through corner holders, adhesives, glues, magnetics, snaps, and any other device for holding two surfaces together. Such implementations may include an adhesive coupling the comestible to the card or a compartment being built within the card which is configured to hold the comestible. In various implementations, the comestible may be sealed in a package prior to it being added to the card. In such implementations, the card may or may not be coupled to an adhesive used to secure the package to the card. The package may be transparent, semitransparent, or translucent in various implementations.

Figure 3:
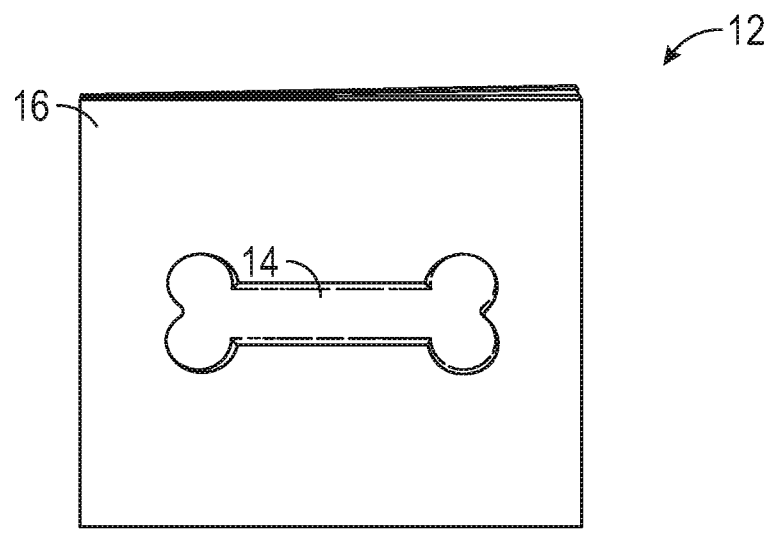
FIG. 3 is a front view of a closed card.
Figure 4:
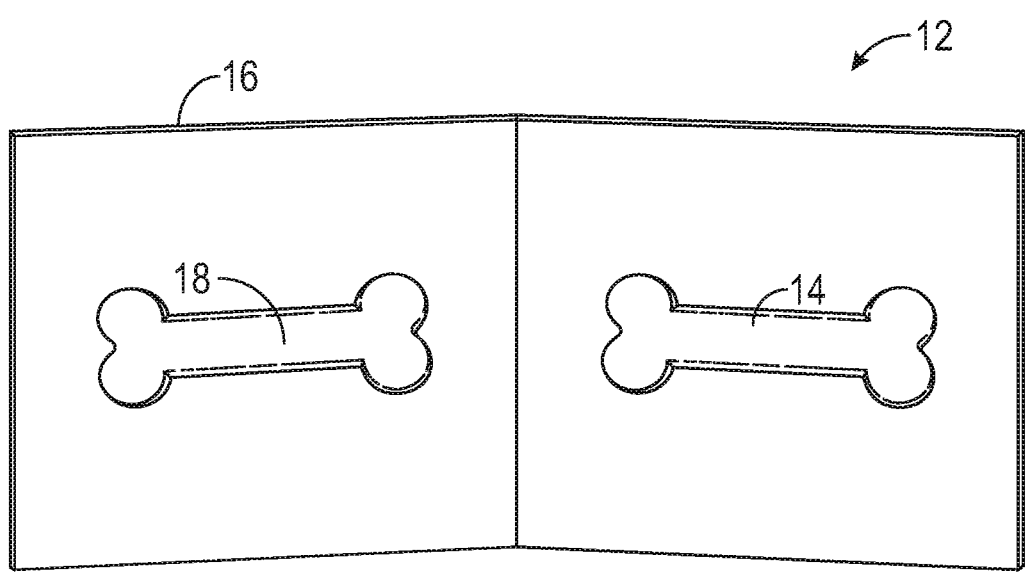
FIG. 4 is a front view of the card of FIG. 3 opened.

The various implementations of cards disclosed herein may be utilized with a variety of different cards including, by non-limiting example, pull-out cards, traditional folding cards, musical cards, pop-up cards, and any other type of card. In various implementations, the structure and/or design of the card may be configured to interact with and/or to match that of the comestible. Referring to FIG. 3, a front view of a card 12 in a closed position having a comestible 14 therein is illustrated. As illustrated, the comestible 14 can be seen through the cover 16 of the card 12 when the card is in a closed position through an opening 18 in the cover 16. Referring to FIG. 4, the card 12 in an open position illustrates the comestible coupled to the inside of the card with the cover 16 having the opening 18 corresponding to the shape (in the implementation illustrated, a dog bone) of the comestible 14. In other implementations, the design and/or structure of the card may correspond with the comestible in other ways. As a non-limiting example, a pop-up card may include a dog which "pops-up" upon opening the card. The comestible, which may be a dog treat, may be configured to contact the pop-up portion of the card, be held in the dogs mouth and also "pop-up" upon opening the card.

In various implementations, the comestible, the packaging of the comestible, the actual card, and any combination thereof may include printing thereon. In various implementations, the printing may be created through laser marking. In other implementations, other printing techniques and/or methods may be used to print upon the comestible, the packaging of the comestible, the actual card, or any combination thereof. In various implementations, the ink printed upon the comestible, the packaging of the comestible, and/or the actual card may be fluorescent. In various implementations, the ink may be 3D printed or laid up, giving contour to the print on the comestible, the packaging of the comestible, and/or the actual card. In various implementations, the print on the comestible, the packaging of the comestible, and/or the actual card may produce an optical illusion or other visual trick such as, by non-limiting example, a hologram. In a particular implementation, the card may have a first image depicted thereon when the card is folded in a first position. The card may then have a second image that becomes visible to the recipient thereon when the card is folded by the recipient in a second position.

In various implementations, the printed ink may include an electronic message therein. In such implementations, the ink may be electrically conductive ink used to form a circuit to allow the electronic message to be displayed and/or played. In various implementations, the electrically conductive ink, or other specialized ink, may allow the product to be tracked. In implementations where the specialized ink is printed on the comestible, the comestible may be tracked, even after ingestion. Such implementations may be valuable to pet owners who desire to track their animals and/or the animals' behavior. In other implementations where the tracked ink is printed on the comestible, a piece of the comestible may be configured to break off and remain in the package. In such implementations, the individual or animal ingesting the comestible and the package may simultaneously be tracked using the specialized ink.

In various implementations, the printed ink may include a radio frequency ID (RFID) tag. In other implementations, an RFID tag may be added (and not necessarily printed) to the card or to the comestible. The RFID tag may be tracked. In such implementations, the either the card or the comestible may include an RFID reader. A display may be coupled to the RFID reader. An RFID tag and RFID reader may, among other things, facilitate the production of the card as it may quickly associate the card with the proper comestible while printing and/or producing the card and comestible to be shipped. In particular implementations, the RFID tag may also be attached to the comestible and may, in various implementations, be read by the RFID reader which may identify the particular comestible to the electronics on the card to allow the card to play/display an associated message designed for that particular comestible type. In various implementations, the RFID reader may display the message or play a message when the card is opened. In implementations where the RFID ready plays a message with audio, the card system may include an integrated circuit coupled to a speaker as described later herein.

In various implementations, the card may include advertisements, coupons, and/or links/codes to coupons printed on or included with the card and corresponding or associated with the comestible included with the edible comestible card. In such implementations, the printed coupon or the printed code for the electronic coupon may be printed on the front flap or the rear flap of the card. In particular implementations, the card may include a quick response (QR) code which may be scannable by an application operated by a mobile phone or other personal computing device which may then, in response, display to the recipient of the card a digital coupon on a display of the mobile phone or other personal computing device. In this manner, the card may both be desirable to the recipient as it includes the comestible therein, and also by the card allowing the recipient to get additional information/savings/coupons for the particular comestible included in the card (or another comestible and/or product or service marketed by the company making the comestible or the company/organization providing the card). In other implementations, the coupon may be used as an entry or as a discounted entry into a special event. In this way retailers/organizations are also able to promote samples of their products and/or events and directly link the recipient to coupons/information/savings related to the comestible or the company making and/or providing the comestible. In various implementations, the coupon may be linked to a tracking system associated with the card, comestible, or comestible packaging. Specifically, the card, comestible, or comestible packaging may be tracked until the associated coupon is used. The tracking system may be any kind of tracking system disclosed herein and may include use of any of a wide variety of telecommunication networks and channels including wireless and wired telecommunication channels.

Similarly, in various implementations, the card may include a tag/card. The tag/card may be configured to couple to an animal collar or a key chain. In other implementations, the tag can be peeled off of the card and adhered to a different item through an adhesive or other coupling mechanism. In various implementations, the tag may be used to receive discounts, entry to events, or additional information, similar to a coupon. The tag may be able to be reloaded for additional discounts and access to events and/or information. In various implementations, the tag may include the name or other identifying information of an individual or animal to be identified. In various implementations, the tag may be tracked similar to other tracking implementations disclosed herein. In other implementations, the tag may be registered with and correspond to the specialized ink tracking on the comestible. In other implementations, the tag may be registered with and associated with identifying information of the individual or animal having the tag. In such implementations, if the animal were lost, an individual may be able to scan the tag and use a database to find the animal's owner and/or other information on the animal.

In various implementations, the card may include a computer chip/integrated circuit/electronic circuit therein. The computer chip may receive power from, by non-limiting example, a battery, solar panel, or from a remote device through wireless power transfer. The computer chip may allow for, among other things, a song or audio message to be played through a speaker or an animated hologram to be displayed from the card. In implementations including audio and a tag, the computer chip may allow for the tag to be read when the card is opened. In other implementations, the card may include one or more lights (which may be LED lights) designed to illuminate the card and/or provide a display light pattern on the card to the recipient.

In various implementations, the card may be configured to engage a variety of the user's senses, such as through hearing (the computer chip playing a message/song), sight (the printed message/image, optical illusions, holograms, and/or lighting), touch (3D printed ink), taste (comestibles), and smell. Implementations configured to engage a recipient's smell may include cards that release an odor upon opening or upon a comestible or other item being removed from the card.

In various implementations, a method of printing, producing, and sending the edible comestible card may include printing the card on demand. Specifically, a user may purchase a card using a telecommunication channel such as the internet or telephone, or any other telecommunication channel. In various implementations, the user may use a portable computing device or desktop computer and a telecommunication channel in combination with various services and databases to specify, by non-limiting example, what they would like printed on the card, the comestible to be included with the card, whether additional coupons (either hard copies or QR codes) are included with the card, and if any other features disclosed herein (such as holograms, lighting, etc.) should be included with the card. The user also specifies where the card is to be shipped and may supply information about the recipient. In various implementations, within minutes of receiving the request in the printer's database, a printer may print any text and/or image on the card, the comestible, and/or the packaging housing the comestible. Other features, such as lighting, etc., may also be added to the card. The proper comestible is then included within the card, and the card and comestible are then placed in a standard sized envelope for mailing or other transport to the recipient. The cards used in a method of making a card using print on demand may be any card disclosed in this document. The card and the associated product, such as a coupon, tag, or comestible, may all be ordered and paid for together, or may be ordered separately and/or paid for separately.

In various implementations, the method may be used for fundraising or to donate money for various organizations. In such implementations, a certain percentage of each purchase may be donated to an organization which may or may not be associated with the comestible, coupon or link thereto, and/or card. As an example, when purchasing a card including a dog treat, a certain percentage of the funds may be donated to an animal shelter which may be selected by the user or which has chosen to associate itself with the card chosen by the user.

In places where the description above refers to particular implementations of card systems and implementing components, sub-components, methods and sub-methods, it should be readily apparent that a number of modifications may be made without departing from the spirit thereof and that these implementations, implementing components, sub-components, methods and sub-methods may be applied to other card systems.

What is claimed is:

1. A card system comprising:
   a card comprising:
      a front flap hingedly coupled to a rear flap;
      an RFID reader; and
      a display coupled with the RFID reader; and
   a planar comestible coupled between the front flap and the rear flap, the planar comestible comprising an RFID tag;
   wherein the RFID reader is configured to read the RFID tag of the planar comestible and change a display of the card using data from the RFID tag.

2. The card system of claim 1, wherein the RFID tag is printed on the planar comestible.

3. The card system of claim 1, wherein the RFID tag is configured to be tracked.

4. The card system of claim 1, wherein the RFID reader is configured to change the display of the card when the card is opened.

5. The card system of claim 1, further comprising an integrated circuit coupled to a speaker, wherein the RFID tag is configured to produce audio through the integrated circuit and the speaker when the card is opened.

* * * * *